(12) United States Patent
Bell

(10) Patent No.: US 9,649,833 B2
(45) Date of Patent: May 16, 2017

(54) DIFFERENTIAL PRINTING DEVICE

(71) Applicant: HEWLETT-PACKARD DEVELOPMENT COMPANY, L.P., Houston, TX (US)

(72) Inventor: Jeffrey F. Bell, Corvallis, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 14/907,410

(22) PCT Filed: Jul. 26, 2013

(86) PCT No.: PCT/US2013/052296
§ 371 (c)(1),
(2) Date: Jan. 25, 2016

(87) PCT Pub. No.: WO2015/012864
PCT Pub. Date: Jan. 29, 2015

(65) Prior Publication Data
US 2016/0176182 A1 Jun. 23, 2016

(51) Int. Cl.
*B41F 13/008* (2006.01)
*B41F 3/58* (2006.01)
*B41F 13/02* (2006.01)
*B41F 13/08* (2006.01)

(52) U.S. Cl.
CPC .............. *B41F 3/58* (2013.01); *B41F 13/008* (2013.01); *B41F 13/02* (2013.01); *B41F 13/08* (2013.01); *B41P 2213/20* (2013.01)

(58) Field of Classification Search
None
See application file for complete search history.

(56) References Cited

U.S. PATENT DOCUMENTS

| 1,395,152 | A | * | 10/1921 | Schneider | ............... | B21F 15/04 |
| | | | | | | 140/118 |
| 4,848,630 | A | * | 7/1989 | Niestrath | .............. | B41F 13/025 |
| | | | | | | 101/248 |
| 5,274,908 | A | | 1/1994 | Suzuki et al. | | |
| 5,323,945 | A | | 6/1994 | Matoushek | | |

(Continued)

FOREIGN PATENT DOCUMENTS

WO    WO-0044563    8/2000

OTHER PUBLICATIONS

International Searching Authority. International Search Report. Mail Date Apr. 16, 2014. Application No. PCT/US2013/052296. Filing date Jul. 26, 2016.

(Continued)

*Primary Examiner* — Joshua D Zimmerman
(74) *Attorney, Agent, or Firm* — HP Inc. Patent Department

(57) ABSTRACT

A differential printing device includes a first print drum including a first ring gear defined on an outside surface of the first print drum. The device also includes a second print drum including a second ring gear defined on an outside surface of the second print drum. A drive shaft that rotates the first print drum and the second print drum has a number of pinion gears to engage the first ring gear and the second ring gear. The number of pinion gears rotate the first print drum and the second print drum at different angular velocities.

19 Claims, 6 Drawing Sheets

(56) References Cited

U.S. PATENT DOCUMENTS

| | | | |
|---|---|---|---|
| 5,417,157 | A | 5/1995 | Kobler |
| 5,456,176 | A | 10/1995 | Strasser |
| 5,930,563 | A | 7/1999 | Reichl et al. |
| 6,382,094 | B1 | 5/2002 | Chiba et al. |
| 2007/0252861 | A1 | 11/2007 | Wu et al. |
| 2007/0283828 | A1 | 12/2007 | Wolber et al. |
| 2011/0017082 | A1 | 1/2011 | Castells et al. |

OTHER PUBLICATIONS

Yen, et al. Geometry Design and Machining of Roller Gear Cams with Cylindrical Rollers. Aug. 1994.

* cited by examiner

DIFFERENTIAL PRINTING DEVICE

BACKGROUND

The ability to quickly print large amounts of paper may be applied in a variety of industries, such as the newspaper industry, the magazine industry, book publishing, product marketing, and any other industry that employs large scale printing infrastructure. Print drums may be used within these industries to quickly apply ink to a large amount of output media, such as paper. As the paper is wrapped around a drum, an ink disposal system deposits the ink on the surface of the paper. In some cases, the print drums may allow ink to be deposited on both sides of the output media.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

Figure 1:
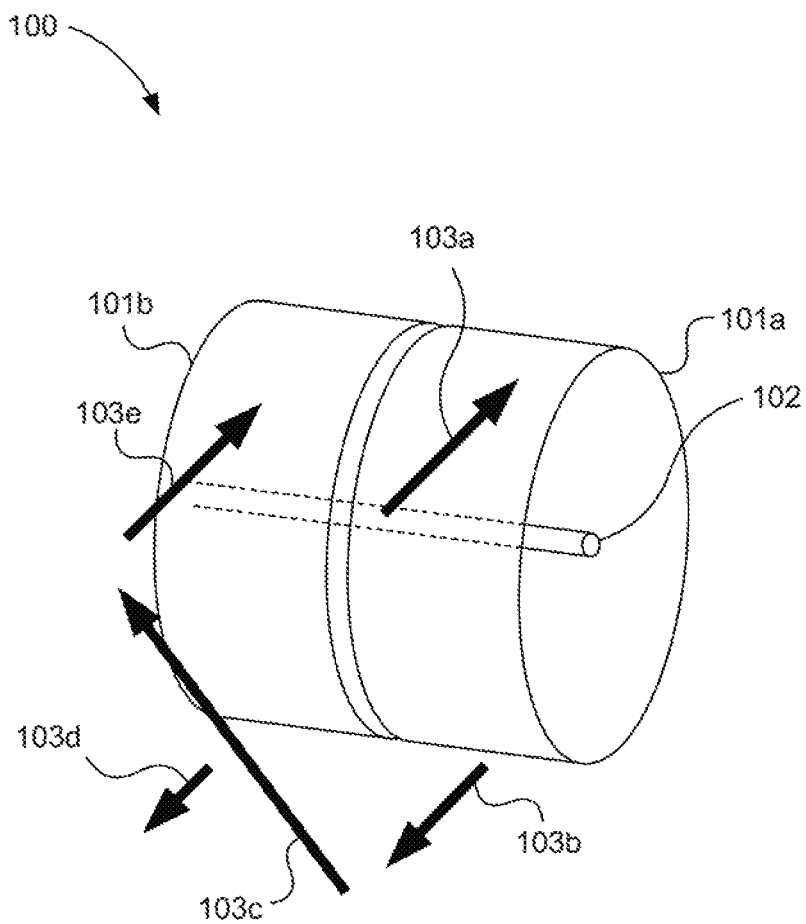
FIG. 1 is an isometric view of a differential printing device, according to one example of the principles described herein.

As described above, print drums may allow ink to be applied to large amounts of paper in a relatively short amount of time. As the drum rotates, paper is fed around the drum, and ink is applied to the paper. For example, ink may be applied via inkjet (drop on demand printing). Other examples may include ink rollers or an ink plate cylinder. In some cases, ink may be applied to both sides of a roll of paper. In this case, multiple print drums may be used, a first print drum to rotate paper in one orientation (i.e., face up), and a second print drum to rotate paper in another orientation (i.e., face down). Large scale printing operations as described include complex printing infrastructure and control systems. Simplifying the printing process and corresponding printing infrastructure may be beneficial in that it reduces the cost of printing, reduces the down time of the printing system, and simplifies control of the printing infrastructure.

However, current printing systems may exhibit significant inefficiencies. For example, printing drums that are web-driven may experience paper jams, misprints, or other printing complications, especially during the beginning and ending of a printing cycle. Additionally, during duplex printing, as ink is applied to a paper roll, the dimensions of the paper roll change slightly due to the applied ink. This results in different angular velocities of the first print drum and the second print drum. To maintain appropriate web tension in the face of the different angular velocities, print drums may be independently driven by a number of drive shafts. Operating multiple drive shafts is both expensive, and complicated. For example, the multiple discrete drives may include complicated tension control algorithms. Moreover, as more drives are added to the system, there are more opportunities for the system to breakdown, which increases the risk of printing downtime.

Thus, the present disclosure describes a differential printing drum. The differential printing drum includes a first print drum that may be rotably coupled to a drive shaft. A second print drum may also be rotably coupled to the same drive shaft. Accordingly, the first print drum and the second print drum may be driven by a common drive shaft. The second print drum may be coaxial to the first print drum. The second print drum may be adjacent to the first print drum.

The present disclosure also describes a differential printing device. The differential printing device may comprise a first print drum with a first ring gear defined on an outside surface of the first print drum. The differential printing device may also comprise a second print drum with a second ring gear defined on an outside surface of the second print drum. A drive shaft passes through the center of the print drums and includes a number of pinion gears to engage the ring gears. The pinion gears allow the first print drum and the second print drum to rotate at different angular velocities.

The present disclosure also describes a differential printing system. The differential printing system may comprise the printing drums as described above. The differential printing system may also comprise a drive shaft having a differential mechanism to selectively rotate a number of the print drums. A power source may be coupled to the drive shaft to supply rotational power.

The differential printing device as described herein may be beneficial in that a single drive shaft supplies an input torque to the first print drum and the second print drum while allowing both drums to rotate independently. This results in a simple and cost-effective means of applying ink to large quantities of paper.

As used in the present specification and in the appended claims, the term "web" is meant to be understood broadly as a roll of paper that is fed through a printing system, in particular over a printing drum.

Further, as used in the present specification and in the appended claims, the term "pass" is meant to be understood broadly as a printing cycle of a roll of paper over a drum. For example, a first pass may be a first cycle of moving a web of paper over the first print drum, and a second pass may be a second cycle of moving the web of paper over the second print drum.

Even still further, as used in the present specification and in the appended claims, the term "a number of" or similar language is meant to be understood broadly as any positive number comprising 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Turning now to the figures, FIG. 1 is an isometric view of a differential printing device (100), according to one example of the principles described herein. As described above, large scale printing operations use print drums to feed large rolls of paper known as "webs" by an ink disposal mechanism such as an inkjet device for drop on demand printing. Other examples of ink disposal mechanisms include an ink roller or an ink plate that dispenses ink on the surface of the paper. Paper is fed onto a print drum and as the paper is moved along the circumference of the print drum, ink may be applied to the paper. In some examples, ink may be applied to both sides of the web. Printing on both sides of a web may be referred to as duplexing. Accordingly, the differential printing device (100) described herein, includes a number of print drums (101a, 101b) that route a web of paper through a printing cycle to apply ink to two surfaces of the web.

The differential printing device (100) may comprise a first print drum (101a) that receives a first pass of the web of paper. The first print drum (101a) may receive the web of paper in a first orientation. For example, the first print drum (101a) may receive the paper in a face up orientation. With the web being fed around the circumference of the first print drum (101a), ink may be applied to a first surface of the web. Similarly, the second print drum (101b) may receive a second pass of the same web of paper. The second print drum (101b) may receive the web of paper in a second orientation. For example, the second print drum (101b) may receive the paper in a face-down orientation. With the web being fed around the circumference of the second print drum (101b), ink may be applied to a second surface of the web. More detail concerning the routing of the web over the first print drum (101a) and the second print drum (101b) is described below. In some examples, the first print drum (101a) and the second print drum (101b) may be coaxial to one another. The first print drum (101a) and the second print drum (101b) may also be adjacent to one another.

The print drums (101a, 101b) may be ratably coupled to a drive shaft (102). In other words, the drive shaft (102) may rotate the first print drum (101a) and the second print drum (101b). For example, the drive shaft (102) may support the print drums (101a, 101b) via a number of roller bearings disposed between the drive shaft (102) and the longitudinal axis of the first print drum (101a) and the longitudinal axis of the second print drum (101b). The drive shaft (102) may also be coupled to the first print drum (101a) and the second print drum (101b) to transfer a torque to the first print drum (101a) and the second print drum (101b). For example, the drive shaft (102) may include a differential mechanism that transfers torque to the print drums (101a, 101b). The torque may rotate the print drums (101a, 101b) which route paper along the circumference of the print drums (101a, 101b) while ink is being applied to the surface of the paper.

The drive shaft (102) may supply a single input torque to both the first print drum (101a) and the second print drum (101b). In other words, the first print drum (101a) and the second print drum (101b) may be configured to be driven by a common drive shaft (102). Nevertheless, the first print drum (101a) and the second print drum (101b) may rotate at different angular velocities because of the differential mechanism that will be described below.

An example of duplex printing using the differential printing device (100) is described as follows. In FIG. 1, a number of arrows (103) may be used to indicate the direction of web feed along the differential printing device (100). The first print drum (101a) may receive a web of paper as indicated by the arrow (103a). As the paper travels along the circumference of the first print drum (101a), ink may be applied to a first surface of the web of paper. After the ink has been applied to the first surface, the web may leave the first print drum (101a) as indicated by the arrow (103b). The paper may then be routed to the second print drum (101b) as indicated by the arrow (103c). While being routed to the second print drum (101b), the ink may dry and the paper may be flipped and offset by a turn bar such that ink may be applied to the second surface of the web that is opposite the first surface of the web. The second print drum (101b) may then receive the web of paper as indicated by the arrow (103d). As the paper travels along the circumference of the second pant drum (101b), ink may be applied to the second surface of the web of paper. After the ink has been applied to the second surface, the web may be routed from the second print drum (101b) to another device as indicated by the arrow (103e).

As will be described in connection with FIG. 2, the differential mechanism may allow the print drums (101a, 101b) to rotate independently. This may be beneficial in that it allows proper tension to be applied to the web during the first pass and the second pass. For example, the paper passing over the first print drum (101a) may not have ink. By comparison, the paper passing over the second print drum (101b) may have ink applied to a first surface. The ink on the first surface may alter the dimensions of the web such that the web dimensions and web speed of the second pass may be different than the web dimensions and web speed of the first pass. Accordingly, the differential printing device (100) may include a differential mechanism that drives the print drums (101a, 101b) at different angular velocities to accommodate the different web dimensions, notwithstanding the single input torque from the drive shaft (102).

The differential printing device (100) that independently drives the printing drums with a single drive shaft (102) while allowing the print drums (101a, 101b) to rotate independently may be beneficial in that it maintains constant tension on the web-feed notwithstanding the change in dimensions, and speed, of the web due to the application of ink on the web. Additionally, a single drive shaft (102) reduces the complexity of the printing system. Accordingly, maintenance processes, and consequently, printer downtime, is reduced. As a result, the cost of printing and the overall complexity of the printing system are reduced.

Figure 2:
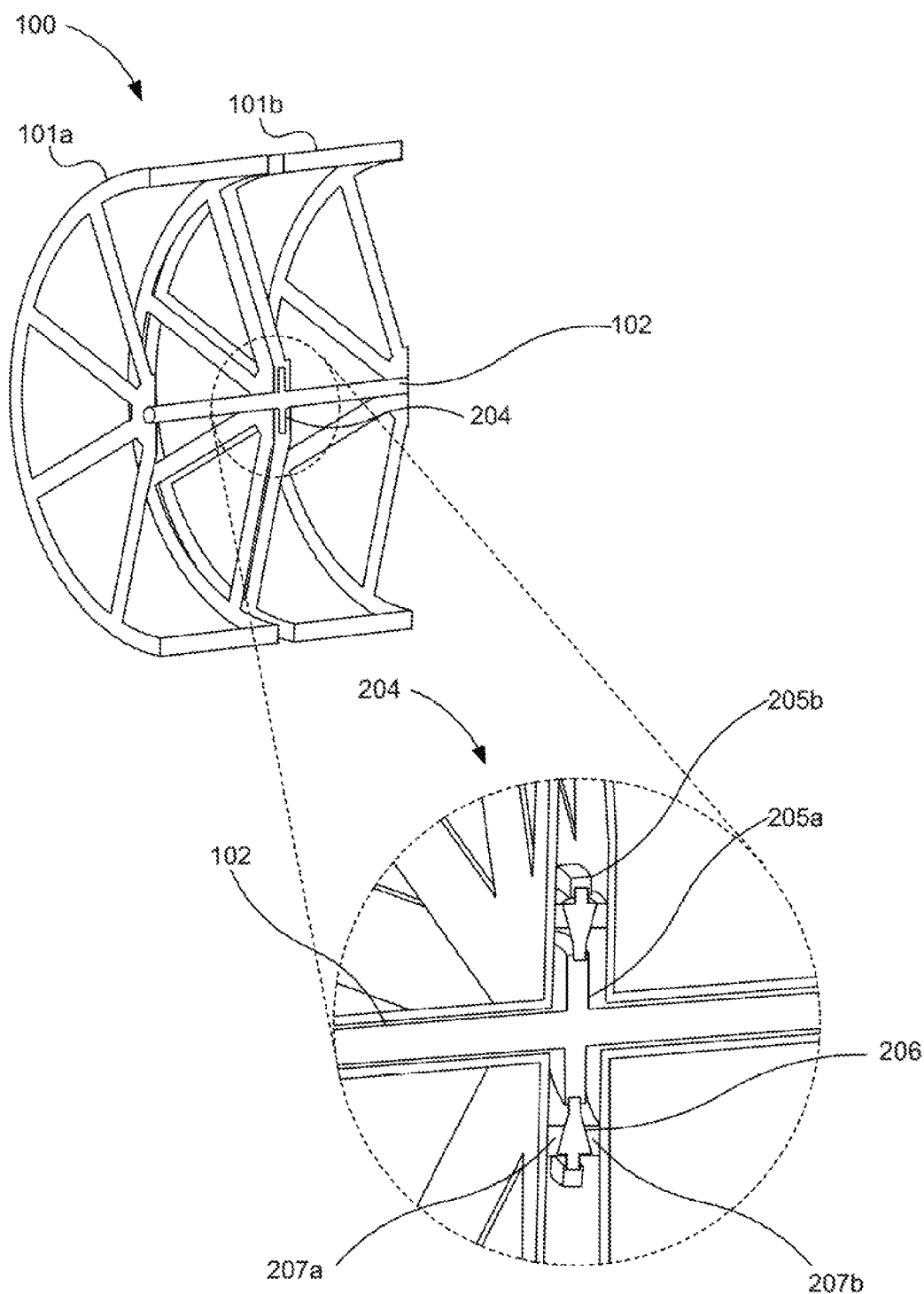
FIG. 2 is a cross-sectional isometric view of a differential printing device, according to one example of the principles described herein.

FIG. 2 is a cross-sectional isometric view of a differential printing device (100), according to one example of the principles described herein. As described above, the differential printing device (100) may comprise a first print drum (101a) to receive a first pass of a web of paper in a first orientation and a second print drum (101b) to receive a second pass of the same web of paper in a second orientation. The first print drum (101a) and the second print drum (101b) may be coaxial to one another, and may be adjacent to one another as depicted in FIG. 2.

A common drive shaft (102) may pass longitudinally through the center of both the first print drum (101a) and the second print drum (101b). The print drums (101a, 101b) may be supported on the drive shaft (102) via a number of roller bearings disposed between the longitudinal axes of the print drums (101a, 101b) and the drive shaft (102). As described above, the first print drum (101a) and the second print drum (101b) may rotate independently, or at different angular velocities. Accordingly, the drive shaft (102) may comprise a differential mechanism (204) that selectively rotates the first print drum (101a), the second print drum (101b), or combinations thereof at different angular velocities. For example, the differential mechanism (204) receives a single input torque from the drive shaft (102). The differential mechanism (204) may then allow the first print drum (101a) to rotate about the drive shaft (102) at a first angular velocity that may be different than the input torque. The differential mechanism (204) may also allow the second print drum (101b) to rotate about the drive shaft (102) at a second angular velocity that may be different than the input torque, the first angular velocity, or combinations thereof. In other words, the differential mechanism (204) may allow the first print drum (101a) and the second print drum (101b) to rotate independently of one another.

The differential mechanism (204) may include a carrier (205) that is rigidly connected to the drive shaft (102). The carrier (205) may support a number of pinion gears (206). The carrier (205) may support the number of pinion gears (206) such that the pinion gears (206) may spin within the carrier (205). The carrier (205) may comprise a lower race (205a) and an upper race (205b). The lower race (205a) of the carrier (205) and the upper race (205b) of the carrier (205) may include a number of roller bearings that allow the number of pinion gears (206) to spin about a longitudinal axis of the pinion gear (206).

The pinion gears (206) may engage ring gears (207) disposed on each of the first print drum (101a) and the second print drum (101b). For example, the first print drum (101a) may comprise a first ring gear (207a) defined on an outside surface of the first print drum (101a). The first ring gear (207a) may include a number of teeth. Similarly, the second print drum (101b) may comprise a second ring gear (207b) defined on an outside surface of the second print drum (101b). The second ring gear (207b) may include a number of teeth. In some configurations, the teeth of the first ring gear (207a) and the teeth of the second ring gear (207b) face one another, as depicted in FIG. 2. The teeth of the pinion gear (206) may mesh with the teeth of the first ring gear (207a), the teeth of the second ring gear (207b), or combinations thereof to transfer the input torque to the first print drum (101a), the second print drum (101b), or combinations thereof. More detail concerning the rotation of the pinion gear (206) and the ring gears (207a, 207b) is described in connection with FIGS. 3-5.

For simplicity, in FIGS. 2-5 the pinion gears (206) and ring gears (207) are depicted as smooth surfaces. However, the pinion gears (206) and the ring gears (207a, 207b) may include teeth that mesh with one another to transfer a torque to the first print drum (101a) the second print drum (101b), or combinations thereof. For example, the pinion gear (206) may have any number, and any type, of teeth that mesh with corresponding teeth of the first ring gear (207a) to transfer all, or a portion, of the input torque to the first print drum (101a). Similarly, the pinion gear (206) teeth may interact with corresponding teeth of the second ring gear (207b) to transfer all, or a portion, of the input torque to the second print drum (101b). Accordingly, the pinion gear (206) and the ring gears (207a, 207b) may be any type of gear. For example, the pinion gear (206) may be a spur gear, a helical gear, a bevel gear, a spiral bevel gear, or a worm gear, among other gear types. Similarly, the ring gears (207a, 207b) may have any number, and any type, of teeth that mesh with corresponding teeth of the pinion gear (206) to receive all, or a portion, of the input torque from the drive shaft (102). Accordingly, the ring gears (207a, 207b) may be spur gears, helical gears, bevel gears, spiral bevel gears, or worm gears, among other gear types.

Including a differential mechanism (204) may be beneficial in that it allows the first print drum (101a) to rotate independently, and at different velocity than the second print drum (101b). Additionally, the differential mechanism (204) allows the first print drum (101a) and the second print drum (101b) to be driven by a single drive shaft (102) that supplies a single input torque. For example, using the differential printing device (100) as described herein, a first print drum (101a) receiving a first pass of a web of paper may rotate at a different angular velocity than a second print drum (101b) receiving a second pass of the same web of paper in which the second pass of the web may have different dimensions on account of the ink on one surface of the web, passing over the second print drum (101b). Allowing the print drums (101a, 101b) to rotate at different angular velocities maintains constant tension on the web during both passes, thus reducing paper jams and other printing complications. Again, as described above, the differential mechanism (204) also allows a single drive shaft (102) to rotate the first print drum (101a) and the second print drum (101b).

Figure 3:
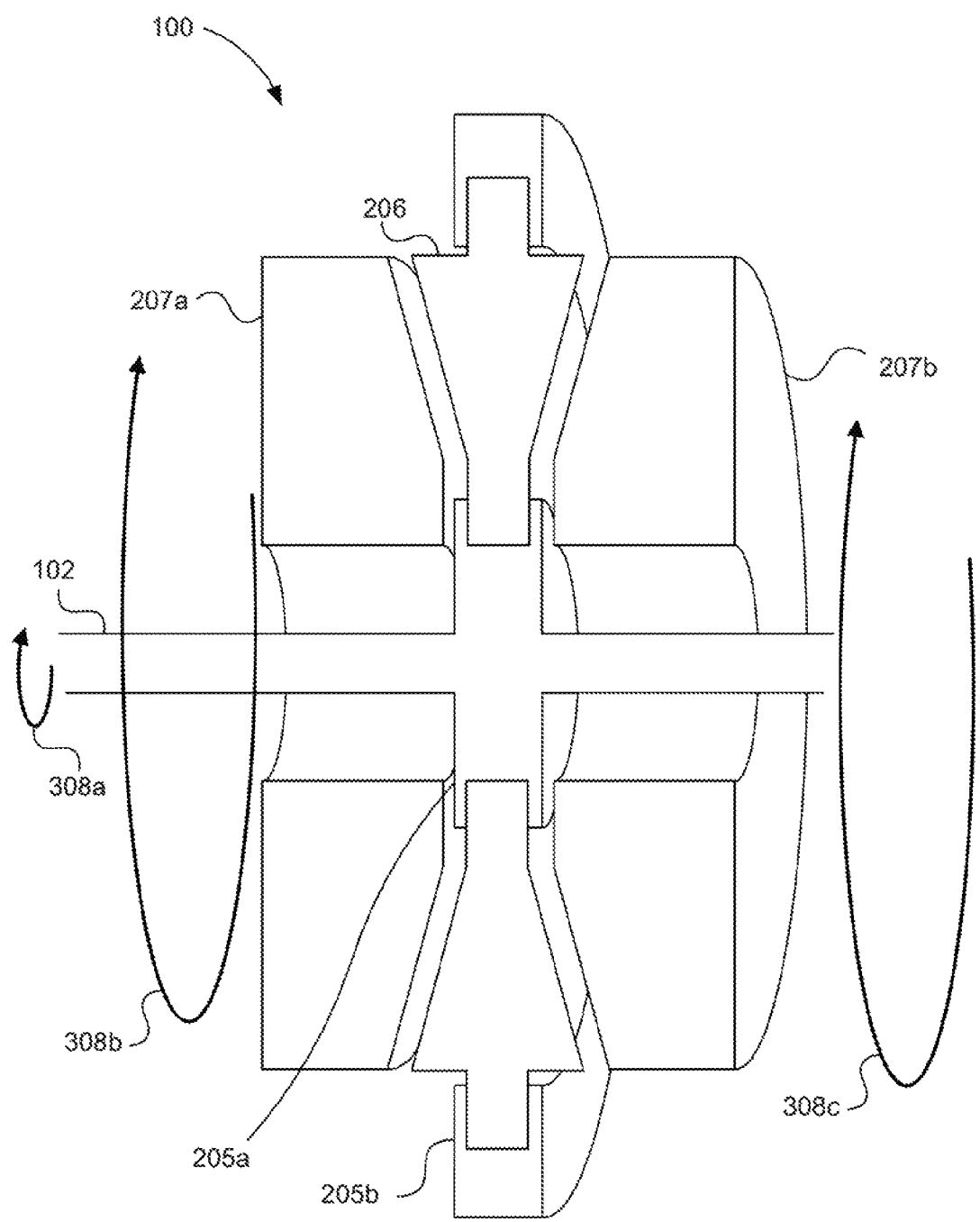
FIG. 3 is a diagram of a differential printing device, according to one example of the principles described herein.

FIG. 3 is a diagram of a differential printing device (100), according to one example of the principles described herein. In FIG. 3, a number of arrows (308) may be used to indicate the rotation of the drive shaft (102), the pinion gear (206), and the ring gears (207a, 207b).

As described above, the drive shaft (102) may supply an input torque to the first print drum (FIG. 1, 101a) and the second print drum (FIG. 1, 101b). For example, the drive shaft (102) may supply an input torque in the direction indicated by the arrow (308a). Accordingly, the drive shaft (102) may rotate at a first angular velocity. The carrier (205), which may be rigidly connected to the drive shaft (102), may also rotate at the first angular velocity. More specifically, the lower race (205a) of the carrier and the upper race (205b) of the carrier may rotate at the first angular velocity. As the number of pinion gears (206) are supported in the carrier by the lower race (205a) and the upper race (205b), the pinion gears (206) may also rotate about the drive shaft (102) at the first angular velocity.

For purposes of explanation, in the example depicted in FIG. 3, the first print drum (FIG. 1, 101a) may rotate at the first angular velocity as indicated by the arrow (308b). In this example, the full input torque is transmitted from the drive shaft (102) to the first print drum (FIG. 1, 101a) via the number of pinion gears (206) and the first ring gear (207a). In other words, the teeth of the pinion gears (206) push the teeth of the first ring gear (207a) rotating the first print drum (FIG. 1, 101a).

Again, for purposes of explanation, in the example depicted in FIG. 3, the second print drum (FIG. 1, 101b) may rotate at the first angular velocity as indicated by the arrow (308c). In this example, the full input torque is transmitted from the drive shaft (102) to the second print drum (FIG. 1, 101b) via the number of pinion gears (206) and the second ring gear (207b). In other words, the teeth of the pinion gears (206) push the teeth of the second ring gear (207b) rotating the second print drum (FIG. 1, 101b).

As described above, the differential mechanism (FIG. 2, 204) and, more particularly, the pinion gears (206) allow the first print drum (FIG. 1, 101a) and the second print drum (FIG. 1, 101b) to rotate at different angular velocities. As will be described in FIGS. 4 and 5, the pinion gears (206) allow this by spinning within the carrier (205), thus allowing different portions of the input torque to be transferred to the first print drum (FIG. 1, 101a) and the second print drum (FIG. 1, 101b).

In the example depicted in FIG. 3 when the first print drum (FIG. 1, 101a) and the corresponding first ring gear (207a) are rotating at the same angular velocity as the second print drum (FIG. 1, 101b) and the corresponding second ring gear (207b), the pinion gears (206) may not spin within the carrier (205). In other words, the teeth of the pinion gear (206) may be stationary with respect to the teeth of the first ring gear (207a) and the teeth of the second ring gear (207b). In this example, the input torque is transmitted as the teeth of the pinion gear (206) push on the teeth of the first ring gear (207a) and the second ring gear (207b). In the example depicted in FIG. 3, the pinion gears (206) may have one degree of motion, i.e., rotating about the drive shaft (102).

Figure 4:
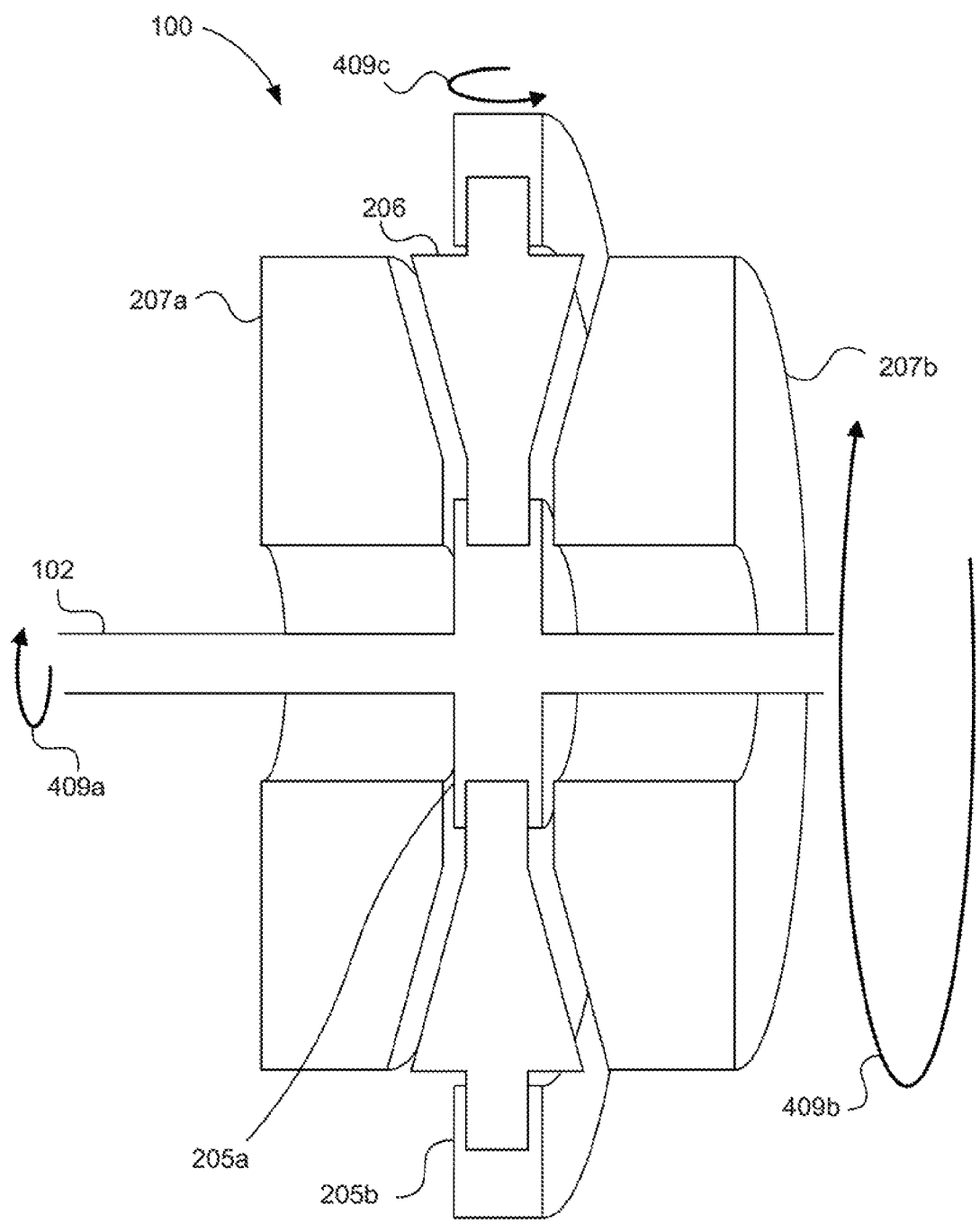
FIG. 4 is a diagram of a differential printing device, according to another example of the principles described herein.

FIG. 4 is a diagram of a differential printing device (100), according to another example of the principles described herein. In FIG. 4, a number of arrows (409) may be used to indicate the rotation of the drive shaft (102), the pinion gear (206), and the ring gears (207a, 207b).

As described above, the drive shaft (102) may supply an input torque to the first print drum (FIG. 1, 101a) and the second print drum (FIG. 1, 101b). For example, the drive shaft (102) may supply an input torque in the direction indicated by the arrow (409a). Accordingly, the drive shaft (102) may rotate at a first angular velocity. The carrier (205), which may be rigidly connected to the drive shaft (102), may also rotate at the first angular velocity. More specifically, the lower race (205a) of the carrier and the upper race (205b) of the carrier may rotate at the first angular velocity. Lastly, as the number of pinion gears (206) are supported in the carrier by the lower race (205a) and the upper race (205b), the pinion gears (206) may also rotate about the drive shaft at the first angular velocity.

For purposes of explanation, in the example depicted in FIG. 4, the first print drum (FIG. 1, 101a) may be held stationary. As a result, the first ring gear (207a) may also be stationary, and may not rotate about the longitudinal axis of the drive shaft (102). In this example, no torque is transmitted from the drive shaft (102) to the first print drum (FIG. 1, 101a). With the first ring gear (207a) stationary, the teeth of the first ring gear (207a) push on the teeth of the rotating pinion gear (206), causing the pinion gear (206) to spin about a longitudinal axis of the pinion gear (206), as depicted by the arrow (409c).

Again, for purposes of explanation, in the example depicted in FIG. 4, the second print drum (FIG. 1, 101b) may rotate at the first angular velocity as indicated by the arrow (409b). In this example, the full input torque is transmitted from the drive shaft (102) to the second print drum (FIG. 1, 101b) via the number of pinion gears (206) and the second ring gear (207b). The input torque is transmitted as the rotating teeth of the pinion gear (206) mesh and push on the teeth of the second ring gear (207a) causing the second print drum (FIG. 1, 101b) to rotate. Accordingly, the first print drum (FIG. 1, 101a) and the second print drum (FIG. 1, 101b) may have different angular velocities. More specifically, the first print drum (FIG. 1, 101a) may have an angular velocity of zero, and the second print drum (FIG. 1, 101b) may have an angular velocity equal to the input torque.

In this example, the differential mechanism (FIG. 2, 204) may supply the input torque to the second print drum (FIG. 1, 101b) while allowing the first print drum (FIG. 1, 101a) to remain stationary. When only one of the print drums (101a, 101b) is rotating, the pinion gears (206) may spin within the carrier (205) as depicted by the arrow (409c). In these cases, the pinion gears (206) may have two degree of motions, i.e., rotating about the drive shaft (102) and spinning about the longitudinal axis of the pinion gear (206).

Figure 5:
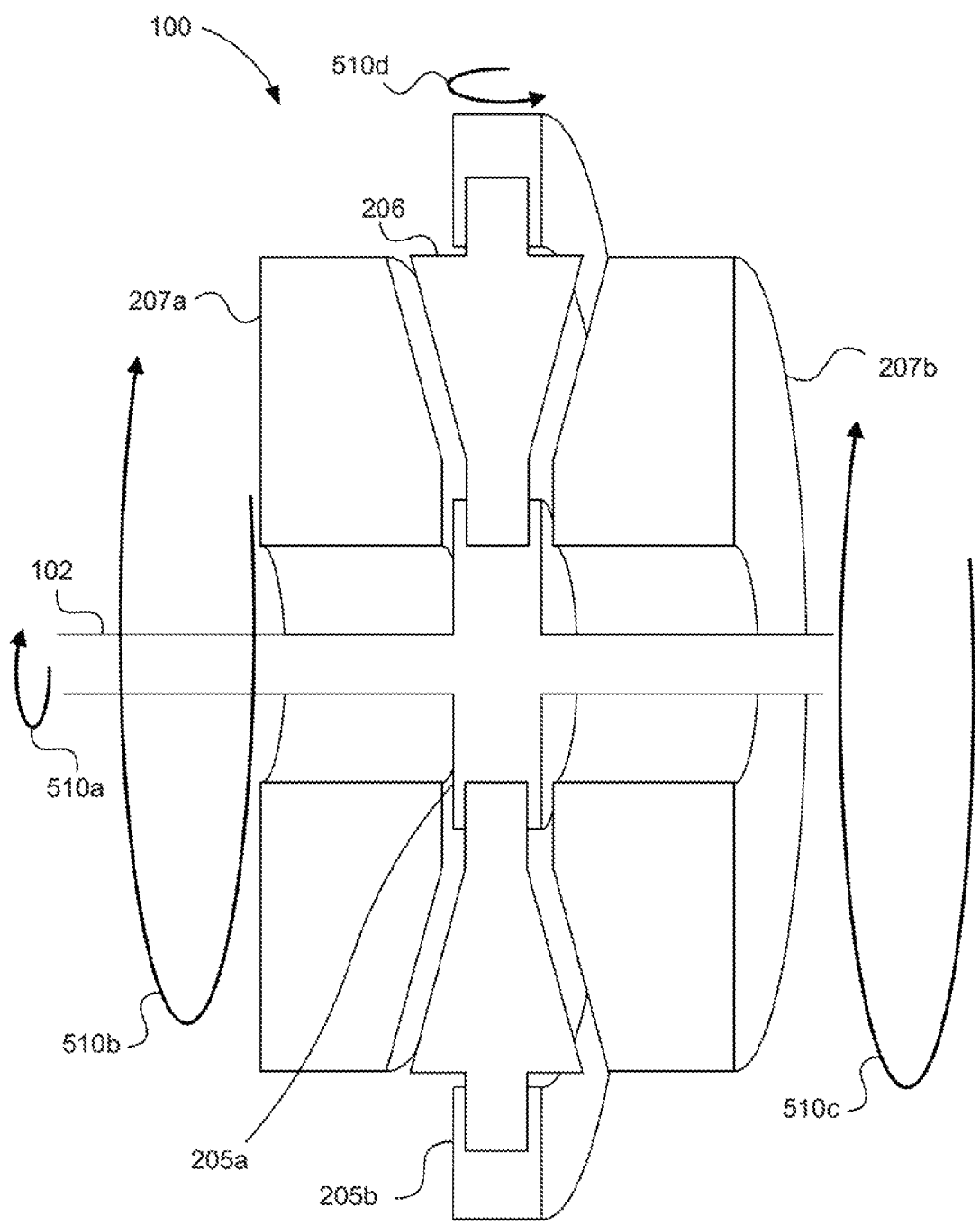
FIG. 5 is a diagram of a differential printing device, according to still another example of the principles described herein.

FIG. 5 is a diagram of an example of the differential printing device (100), according to one example of the principles described herein. In FIG. 5, a number of arrows (510) may be used to indicate the rotation of the drive shaft (102), the pinion gear (206), and the ring gears (207a, 207b).

As described above, the drive shaft (102) may supply an input torque to the first print drum (FIG. 1, 101a) and the second print drum (FIG. 1, 101b). For example, the drive shaft (102) may supply an input torque in the direction indicated by the arrow (510a). Accordingly, the drive shaft (102) may rotate at a first angular velocity. The carrier (205), which may be rigidly connected to the drive shaft (102), may also rotate at the first angular velocity. More specifically, the lower race (205a) of the carrier and the upper race (205b) of the carrier may rotate at the first angular velocity. Lastly, as the number of pinion gears (206) are supported in the carrier by the lower race (205a) and the upper race (205b), the pinion gears (206) may also rotate about the drive shaft at the first angular velocity.

For purposes of explanation, in the example depicted in FIG. 5, the first print drum (FIG. 1, 101a) and the second print drum (FIG. 1, 101b) may rotate at different angular velocities. As a result, the that ring gear (207a) and the second ring gear (207b) may also rotate at different angular velocities. For example, the first ring gear (207a) may rotate at a second angular velocity indicated by the arrow (510b). Similarly, the second ring gear (207b) may rotate at a third angular velocity indicated by the arrow (510c). As described above, the relative motion of the first ring gear (207a) and the second ring gear (207b) may cause the pinion gear (206) to rotate at a fourth angular velocity indicated by the arrow (510d).

The teeth of the spinning pinion gears (206) push on the teeth of the first ring gear (207a) and the second ring gear (207b) to cause the print drums (FIG. 1, 101a, 101b), albeit at different angular velocities. In the example depicted in FIG. 5, the pinion gears (206) may have two degree of motions, i.e., rotating about the drive shaft (102) and spinning about the longitudinal axis of the pinion gear (206).

Figure 6:
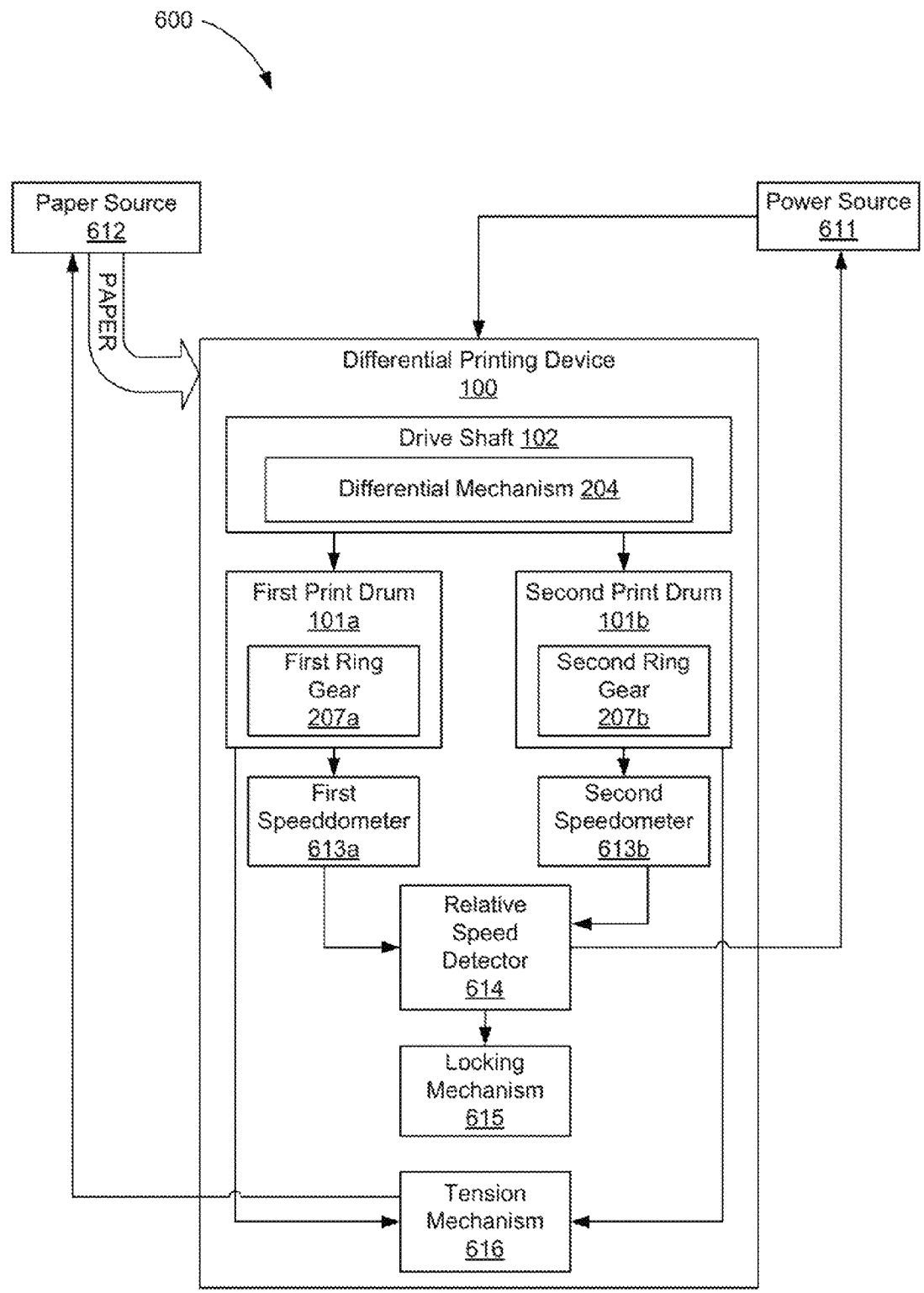
FIG. 6 is a block diagram of a differential printing system, according to one example of the principles described herein.

FIG. 6 is a block diagram of a differential printing system (600), according to one example of the principles described herein. The differential printing system (600) may include a power source (611). The power source may be coupled to differential printing device (100) and provide an input torque to the drive shaft (102). As will be described below, in some examples, the power source (611) may supply the input torque based on the motion of the print drums (101a, 101b) relative to one another.

The differential printing device (100) may include a drive shaft (102), a differential mechanism (204), a first print drum (101a), a second print drum (101b) and corresponding ring gears (207a, 207b) that may be examples of similar elements described in connection with FIGS. 1 and 2. As described above, the print drums (101a, 101b) may receive paper. For example, the differential printing device (100) may be coupled to a paper source (612) that supplies paper to the differential printing device (100). More specifically, the paper source (612) may route paper to the first print drum (101a) so that ink may be applied to a first surface of the paper via an inkjet for example for drop on demand printing.

The differential printing system (600) may also include a number of speedometers (613a, 613b) to measure the angular velocity of the print drums (101a, 101b), respectively. For example, a first speedometer (613a) may measure the angular velocity of the first print drum (101a) and the second speedometer (613b) may measure the angular velocity of the second print drum (101b). In some examples, the differential printing system (600) may include a number of resolvers, or encoders (not shown) to perform position encoding on the print drums (101a, 101b).

The differential printing system (600) may include a relative speed detector (614) that detects the angular velocity of the first print drum (101a) and the second print drum (101b) relative to one another. For example, the relative speed detector (614) may receive data from the first speedometer (613a) and the second speedometer (613b) to detect the difference in the angular velocities of the print drums (101a, 101b).

As mentioned above, the relative speed detector (614) may be coupled to the power source (611). In this example, the power source (611) may supply power to the differential printing device (100) based on the relative speed of the print drums (101a, 101b). For example, the power source (611) may reduce the power supply if the relative speed of the drums is greater than a threshold amount. More specifically, if the first print drum (101a) is rotating faster than the second print drum by an amount greater than a threshold amount, the power source (611) may reduce the supplied power.

In some examples, the differential printing system (600) may include a locking mechanism (615) to secure the first print drum (101a), the second print drum (101b), or combinations thereof. For example, if a problem is detected on a drum (101a, 101b), the locking mechanism (615) may lock the first print drum (101a), the second print drum (101b), or combinations thereof. An example of a problem may be that the relative angular velocities of the print drums (101a, 101b) are greater than a determined threshold.

The differential printing system (600) may include a tension mechanism (616) that regulates the tension of paper in the system (600). The tension mechanism (616) may receive an indication from the first print drum (101a), the second print drum (101b), or combinations thereof of the tension of the web on that print drum (101a, 101b). Accordingly, the tension mechanism (616) may control the paper source (612) such that the tension on the web is constant throughout the printing process.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, a processor or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The specification and figures describe a differential printing device (FIG. 1, 100). The differential printing device (FIG. 1, 100) comprises a first print drum (FIG. 1, 101a) having a first ring gear (FIG. 2, 207a) defined on an outside surface of the first print drum (FIG. 1, 101a), a second print drum (FIG. 1, 101b) having a second ring gear (FIG. 2, 207b) defined on an outside surface of the second print drum (FIG. 1, 101b), a drive shaft (FIG. 1, 102) to rotate the first print drum (FIG. 1, 101a) and the second print drum (FIG. 1, 101b), the drive shaft (FIG. 1, 102) having a number of pinion gears (FIG. 2, 206) to engage the first ring gear (FIG. 2, 207a) and the second ring gear (FIG. 2, 207b). The number of pinion gears (FIG. 2, 206) rotate the first print drum (FIG. 1, 101a) and the second print drum (FIG. 1, 101b) at different angular velocities.

The specification and figures also describe a differential print drum. The differential drum comprises a first print drum (FIG. 1, 101a) rotably coupled to a drive shaft (FIG. 1, 102), and a second print drum (FIG. 1, 101b) rotably coupled to the drive shaft (FIG. 1, 102) that is coaxial to, and adjacent to the first print drum (FIG. 1, 101a). The first print drum (FIG. 1, 101a) and the second print drum (FIG. 1, 101b) are driven by the drive shaft (FIG. 1, 102).

The specification and figures also describe a differential printing system (FIG. 6, 600). The differential printing system (FIG. 6, 600) comprises a split print drum comprising a plurality of coaxial print drums (FIG. 1, 101) positioned adjacent to one another. The differential printing system (FIG. 6, 600) also comprises a drive shaft (FIG. 1, 102) having a differential mechanism (FIG. 2, 204) to selectively rotate a plurality of print drums (FIG. 1, 101), and a power source (FIG. 6, 611) to supply an input torque to the drive shaft (FIG. 1, 102). The plurality of coaxial print drums (FIG. 1, 101) receive a plurality of passes of paper.

The differential printing device (FIG. 1, 100) may have a number of advantages, including: (1) driving multiple print drums (FIG. 1, 101) via a single drive shaft (FIG. 1, 102); (2) allowing the print drums (FIG. 1, 101) to rotate independent of one another; (3) reducing complexity of a printing system; and (4) reducing the overall cost of the printing system.

The preceding description has been presented to illustrate and describe examples of the principles described. This description is not intended to be exhaustive or to limit these principles to any precise form disclosed. Many modifications and variations are possible in light of the above teaching.

What is claimed is:

1. A differential printing device comprising:
   a first print drum comprising a first ring gear defined on an outside surface of the first print drum;
   a second print drum coaxial to the first print drum comprising a second ring gear defined on an outside surface of the second print drum;
   a drive shaft to rotate the first print drum and the second print drum, the drive shaft comprising a number of pinion gears to engage the first ring gear and the second ring gear;
   in which the number of pinion gears rotate the first print drum and the second print drum at different angular velocities.

2. The device of claim 1, in which teeth of the first ring gear face teeth of the second ring gear.

3. The device of claim 1, further comprising:
   a first speedometer to measure the angular velocity of the first print drum; and
   a second speedometer to measure the angular velocity of the second print drum.

4. The device of claim 1, in which the drive shaft supplies a single input torque to the first print drum and the second print drum that is apportioned differently to the first print drum and the second print drum.

5. The device of claim 1, further comprising a relative velocity detector to detect the angular velocities of the first print drum and the second print drum relative to one another.

6. The device of claim 1, wherein the number of pinion gears rotate the first print drum and the second print drum at different angular velocities by transfer of a different portion of input torque to the first print drum and the second print drum based on spin of the number of pinion gears.

7. The device of claim 1, further comprising a carrier wherein the number of pinion gears spin with the carrier.

8. The device of claim 1, wherein teeth of the number of pinion gears push teeth of the second ring gear to rotate the second print drum.

9. The device of claim 7, wherein a number of teeth pushed of the first ring gear is different from a number of teeth pushed of a second ring gear.

10. A differential print drum comprising:
a first print drum rotably coupled to a drive shaft via a first pinion gear and first ring gear, the first pinion gear having multiple degrees of motion; and
a second print drum rotably coupled to the drive shaft via a second pinion gear and second ring gear, the second pinion gear having multiple degrees of motion and the second print drum coaxial to the first print drum;
in which the first print drum and the second print drum are driven by the drive shaft at different angular velocities relative to motion of the first ring gear and the second ring gear as caused by spin of the first pinion gear and the second pinion gear.

11. The print drum of claim 10, in which the first print drum and the second print drum rotate independent of one another.

12. The print drum of claim 10, in which the first print drum receives paper in a first orientation, and the second print drum receives paper in a second orientation.

13. The print drum of claim 10, wherein the multiple degrees of motion of the first pinion gear and the second pinion gear include rotating about the drive shaft and spinning about a longitudinal axis of the respective pinion gear.

14. A differential printing system comprising:
a split print drum comprising:
a plurality of coaxial print drums positioned adjacent to one another;
a drive shaft comprising a differential mechanism to selectively rotate a number of print drums, wherein the differential mechanism comprises a number of pinion gears to selectively engage with a plurality of ring gears disposed on outside surfaces of the plurality of coaxial print drums; and
a power source to supply an input torque to the drive shaft based on the motion of the coaxial print drums relative to one another;
in which the number of coaxial print drums receive a number of passes of paper.

15. The system of claim 14, in which the drive shaft passes longitudinally through the center of the plurality of coaxial print drums.

16. The system of claim 14, further comprising a carrier to support the number of pinion gears.

17. The system of claim 14, in which the power source rotates the drive shaft based on an angular velocity of the plurality of print drums relative to one another compared to a threshold amount.

18. The system of claim 14, further comprising a locking mechanism to secure the plurality of coaxial print drums.

19. The system of claim 14, further comprising a tension mechanism to control the tension of paper in the differential printing system.

* * * * *